Aug. 15, 1961    A. W. STAS    2,996,566
FLOOR TYPE OUTLET BOX
Filed Sept. 14, 1959    2 Sheets-Sheet 1

INVENTOR.
Andrew W. Stas
BY
Wolfe, Hubbard, Voit & Osann
Attys.

Aug. 15, 1961   A. W. STAS   2,996,566
FLOOR TYPE OUTLET BOX
Filed Sept. 14, 1959   2 Sheets-Sheet 2
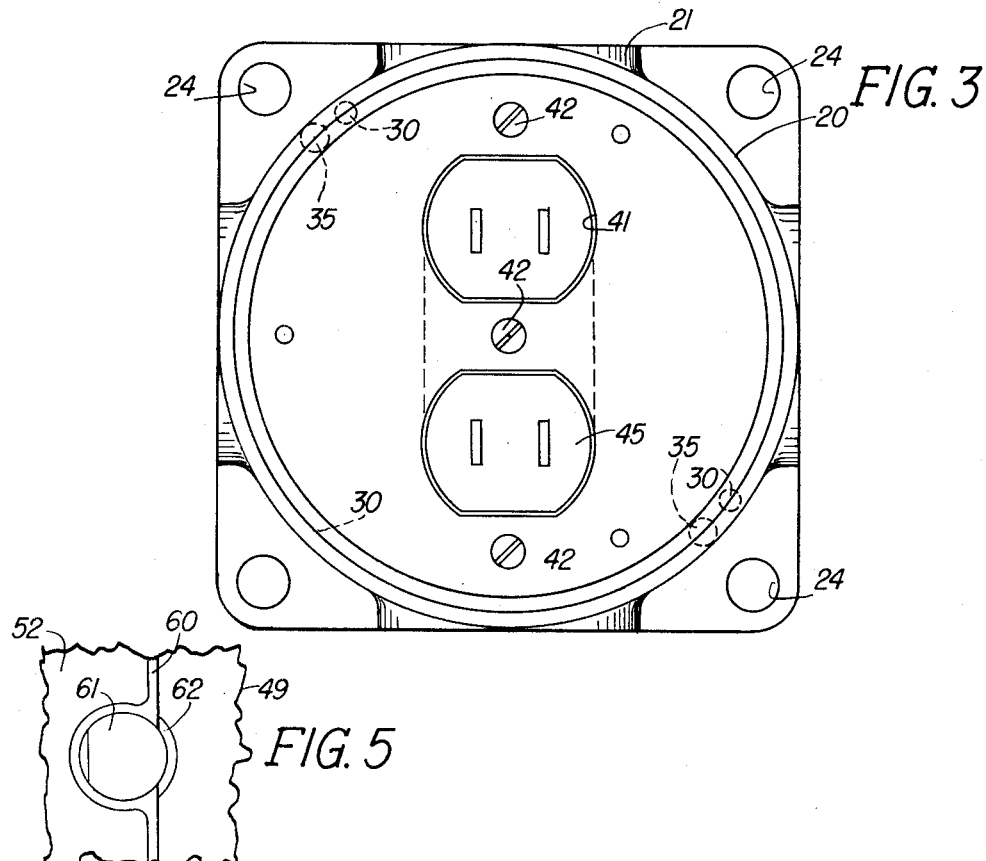
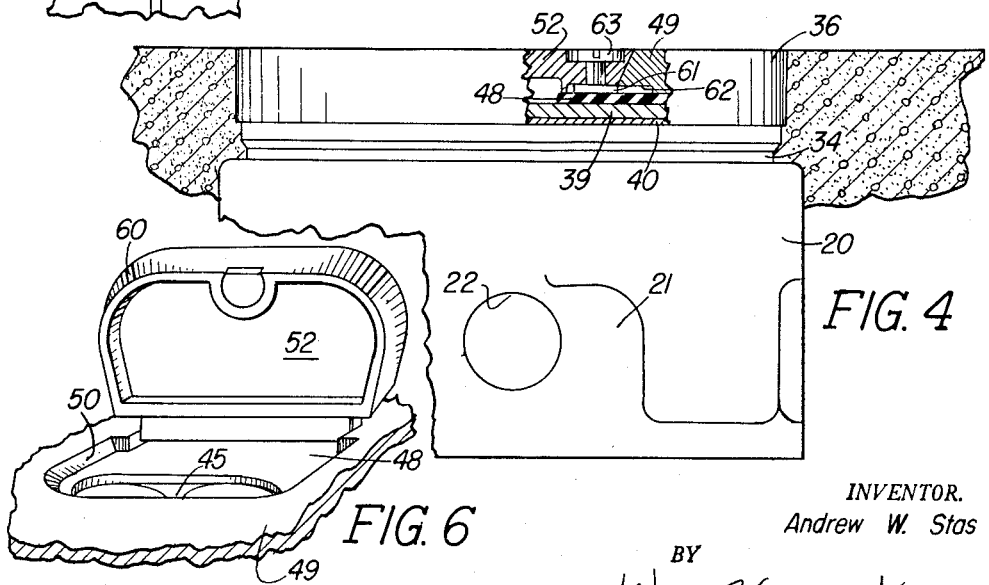
INVENTOR.
Andrew W. Stas
BY
Wolfe, Hubbard, Voit & Osann
Attys.

United States Patent Office 2,996,566
Patented Aug. 15, 1961

2,996,566
FLOOR TYPE OUTLET BOX
Andrew W. Stas, Chicago, Ill., assignor to Lew Electric Fittings Co., Chicago, Ill., a corporation of Illinois
Filed Sept. 14, 1959, Ser. No. 839,926
5 Claims. (Cl. 174—53)

The present invention relates to floor type outlet boxes, and more particularly to an improved water tight flush floor box and cover for mounting a duplex receptacle.

The primary object of the present invention is to enclose a duplex receptacle in a floor type outlet box which, when opened, provides access to a duplex receptacle and which can be quickly and easily sealed to afford a water tight housing which is flush with the floor in which the box is mounted.

More specifically, it is an object of the present invention to provide an improved, flush, removable cover for a duplex receptacle mounted in a floor type outlet box. A related object is to provide a hinged cover for a floor type outlet box which can be closed to afford a water tight, flush seal which can be locked in that position by a simple yet rugged latch mechanism, and which can be easily and quickly opened to expose a duplex receptcale mounted within the box.

Other objects and advantages of the present invention will become apparent as the following description proceeds taken in connection with the accompanying drawings wherein:

FIG. 3 is a plan view similar to FIG. 1 but with the cover and mounting means therefor removed from the box to expose the duplex receptacle therein.

FIG. 4 is an elevation view, partly in section, of an outlet box and cover constructed in accordance with the present invention and illustrating specifically the cover latch construction.

FIG. 5 is a fragmentary plan view illustrating further the cover latch mechanism.

FIG. 6 is a perspective fragmentary view of the box with the cover opened to expose a duplex receptacle.

Figure 1:
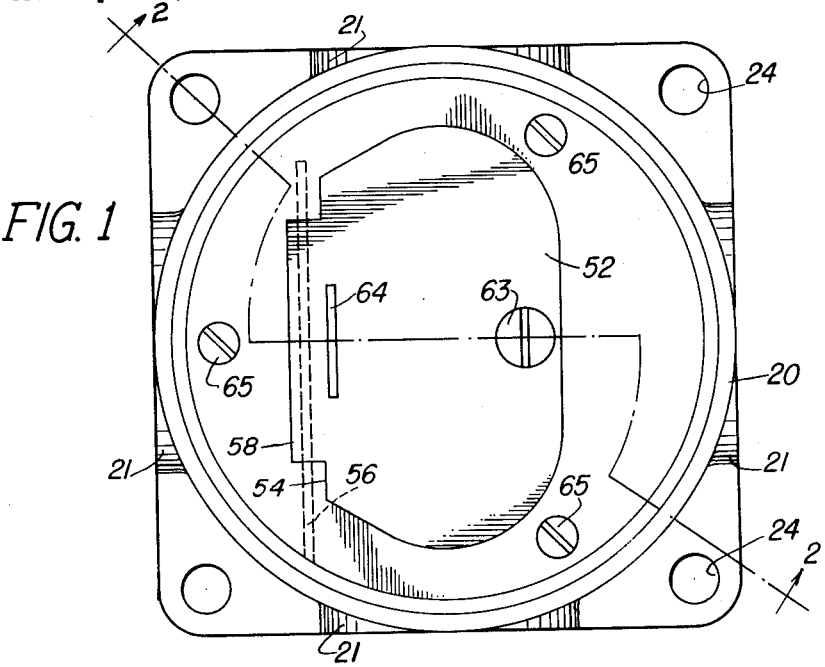
FIGURE 1 is a plan view of an outlet box and cover embodying the present invention.

While a certain illustrative floor type outlet box has been shown in the drawings and will be described below in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

Sealed water tight outlet boxes for use in concrete floors have been widely used. These boxes are produced in essentially two parts, first, a roughing-in component which is mounted along with suitable conduit in the rough floor, and a second finish and cover potrion which projects upwardly from the rough portion and is positioned in the finished floor surface. There is shown in the drawings an improved outlet box which is constructed in this manner although provided with an improved finish and cover portion.

For use in the roughing-in operation the outlet box embodying the present invention comprises a housing 20 provided with a plurality of bosses 21 defining access openings 22 which are conventionally threaded for receiving the threaded end of heavy wall rigid conduit (not shown). The housing or box 20 is provided with suitable mounting flanges 23 having appropriate fastening holes 24 therethrough. This housing is connected to the desired rigid wall conduit as the wiring system is positioned in the floor. An opening in the top of the box, defined by the walls thereof, is covered with a sheet metal cap (not shown) and concrete is poured around the box and the conduit. Once this concrete has set, the sheet metal cover is removed exposing the box opening and enabling the remainder of the outlet box construction to be inserted into place before the finished layer of the concrete floor is poured.

Figure 2:
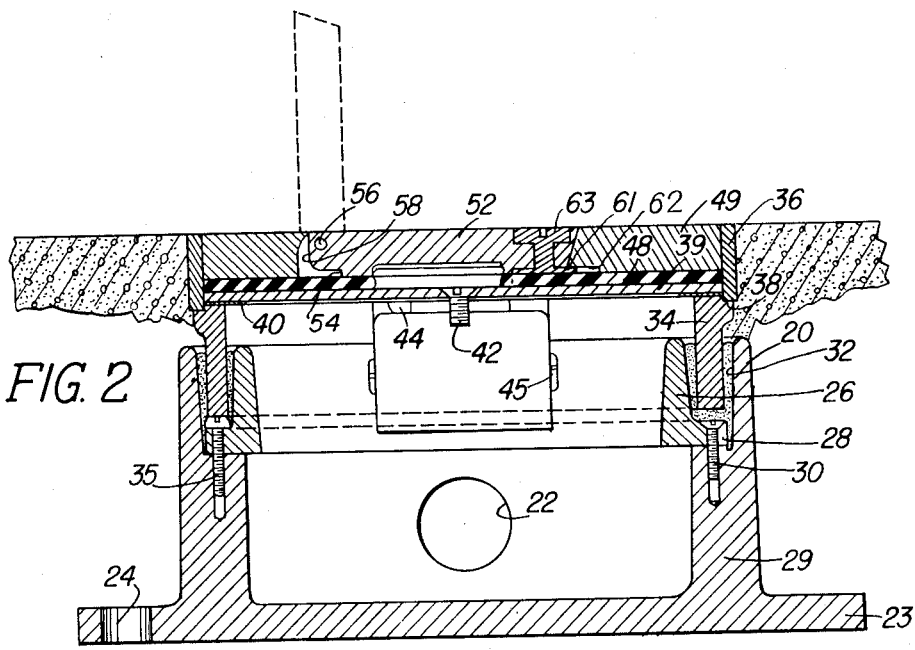
FIG. 2 is a section view taken substantially in the plane of line 2—2 of FIG. 1 illustrating a duplex receptacle mounted in position within the box and enclosed by the box cover which is latched in position.

In accordance with the present invention, the box is intended for use with a duplex type receptacle and is provided with a water tight cover for sealing the receptacle within the box. For supporting the receptacle and cover assembly, the roughed-in box conventionally includes an inner annular ring 26 having at its lower edge a flange 28 which is positionable above a plurality, three in this case, of equally spaced abutments 29 within the housing 20. The ring is secured to these abutments by screws 30 extending through the flange 28 on the ring 26 and threadably engaged with the abutments 29 as shown in FIG. 2.

The annular ring 26 and flange 28 define, with the wall of the housing 20, an annular channel 32 for receiving a sleeve 34 of the receptacle and cover assembly. This generally annular sleeve is positioned within the annular channel 32 and rests on the heads of a pair of spaced height adjustment screws 35 threadably engaged through the flange 28 of the inner ring 26. By adjusting the height of these screws 35, the height of the sleeve 34 within the housing 20 is determined so that the final or ultimate height of the cover can be determined in accordance with the thickness of the finished concrete layer on the floor. Once the height of the ring is determined the ring 26 is secured and sealed into place by air setting cement in the annular channel there is mounted on the upper end of the sleeve 34 a brass ring 36, which ring is positioned against a shoulder 38 defined on the sleeve 34 and is braised thereto. Enclosed within the ring 36 is a brass plate 39 which is spaced from the upper edge of the sleeve 34 by a fiber washer 40. For supporting a duplex receptacle 45 the plate 39 is provided with an access opening 41 corresponding to the shape of the receptacle and with appropriate apertures for receiving mounting screws 42 which are threadably engaged with ears 44 on the receptacle 45.

For mounting a cover which serves to provide a water tight seal for the duplex receptacle, the ring 36 and plate 39 define a recess into which a gasket 48 of resilient material is placed and on which is mounted a cover plate 49. The gasket 48 is cut to provide openings for the duplex receptacle. This gasket is made of a suitable resilient material such as neoprene rubber conventionally employed in gaskets for electrical fittings.

Turning now to the cover plate construction, the plate 49 is provided with a generally oblong shaped aperture 50 of a size sufficient to expose both receptacles of the duplex receptacle 45. Hingeably mounted at one edge of the oblong aperture 50 in the cover plate is a cover 52 having a hinge 54 in one edge and a latch 55 in the edge thereof opposite from the hinge 54. The edges of the cover 52 and plate opening 50 are desirably formed with a complementary taper as shown in FIGS. 2 and 6 so that the cover fits tightly within the aperture and yet is flush with the surface of the plate 49. The hinge 54 is essentially a pin 56 which extends through the cover plate and a projection 58 on one edge of the cover 52.

In order to engage the gasket 48 in the area surrounding the duplex receptacle 45 to provide a water tight seal therewith, the cover 52 is recessed to define a sealing edge 60. This sealing edge, when the cover is tightened into position by engagement of the latch 55 with the plate, bites into the sealing gasket 48 and forms a water tight seal therewith. By constructing the cover to be slightly thicker than the cover plate so that it is necessary to force it into the gasket to close the aperture and provide a seal, the sealing action afforded by the sealing edge 60 has been found to produce a liquid tight joint surrounding the duplex receptacle.

An additional feature of the present invention is the simple lock construction which is provided. This construction is shown in detail in FIGS. 4 and 5 and comprises a latch member 61 pivotally mounted on the cover 52 and engageable beneath a ledge or shoulder 62 which defines a recess in the adjacent portion of the cover plate 49. The latch 61 is conveniently constructed as a circular member having a segmental portion removed as shown in FIGS. 5 and 6, to define a chord-like edge 63. When the latch is turned a segmental portion projects beneath the shoulder 62 in the cover plate as shown in FIGS. 4 and 5.

The circular member 61 is progressively tapered in thickness from a relatively narrow dimension at the chord edge to a relatively thick portion opposite to this edge. As the latch is turned so that a segmental portion projects beneath the shoulder, the further the latch is turned the tighter the cover becomes. When the latch is turned so that the thickest portion of the disc is beneath the shoulder, the latch is in its tightest position and it serves to force the edge or rim 60 of the cover into water tight sealing engagement with the gasket 48.

The latch is provided with a slotted head 63 projecting in the surface of the cover 52 which may be engaged by a screw driver or the like to turn the latch to its locking position. It has been found that the gasket 48 when compressed by the edge 60 affords a slight spring-like releasing action to raise the cover slightly so that it may be readily engaged by the fingers. Alternatively, a slot 64 (FIG. 1) is provided in the cover adjacent the hinge which may be engaged by a screw driver which is tilted to lift the cover to its open position and expose the duplex receptacle therein.

The cover plate is secured to the sleeve 34 by means of screws 65 which extend through the cover plate 49 and the inner plate 39, on which the duplex receptacle 45 is mounted, into engagement with suitable bosses (not shown) projecting from the sleeve 34. To replace a damaged receptacle it is merely necessary to remove the cover plate, the gasket, and the inner plate 39 which carries the receptacle with it.

To summarize the foregoing, I have provided an improved cover and sealed closure device for use in mounting a duplex receptacle within a floor type outlet box. The cover is always conveniently attached to the cover plate and can be tightened into sealing position over the receptacle by simply closing it and turning the latching device. With this construction the use of a separate removable threaded plug is obviated with its attendant disadvantages, notably a lost or misplaced plug. It is a simple matter to wash or clean floors having outlet box constructions in accordance with the present invention. To do so, any electrical plugs are removed from the outlet receptacle and the cover is closed and locked into sealing position. This completely seals the outlet box and receptacle against the entrance of moisture. The neoprene gasket 48 fits tightly around the duplex receptacle. Furthermore, any dirt which may collect within the recess in the cover plate 49 is easily removed by a vacuum cleaner or the like.

I claim as my invention:

1. A closure device for a floor outlet box for use in concrete floors and comprising a cylindrical rough-in housing, an annular member positioned in said housing and including an upstanding sleeve, and a plate sealingly fitted within said sleeve and mounting a duplex receptacle, said device comprising a resilient gasket covering said plate surrounding said receptacle and a cover plate forming a surface substantially flush with the concrete floor when mounted tightly against said gasket and also having an access opening therein exposing said receptacle, said cover plate including an elongated cover hingedly mounted in said access opening and overlying said duplex receptacle, means for locking said cover in place to seal said opening and thereby enclose said opening, and said cover having a downwardly extending sealing rim which bites into the gasket when the cover is locked thereby to provide a water tight seal around said receptacle.

2. A closure device for a floor outlet box for use in concrete floors and comprising a cylindrical rough-in housing, an annular member adjustably positioned in said housing and including an upstanding sleeve, and a plate sealingly fitted within said sleeve and mounting a duplex receptacle, said device comprising a resilient gasket covering said plate surrounding said receptacle, a cover plate forming a surface substantially flush with the concrete floor when mounted tightly against said gasket and also having an access opening therethrough exposing said receptacle, said cover plate including an elongated cover hingedly mounted in said access opening and overlying said duplex receptacle, said cover and said cover plate having corresponding inwardly tapered marginal surfaces, means for locking said cover in place to seal said opening and enclose said receptacle, and said cover having a downwardly extending sealing rim adjacent the marginal edge thereof, which rim bites into the gasket when the cover is locked in place thereby to provide a water tight seal around said receptacle.

3. A closure device for a floor outlet box for use in concrete floors and comprising a cylindrical rough-in housing, an annular member positioned in said housing and including an upstanding sleeve, and a plate sealingly fitted within said sleeve and mounting a duplex receptacle, said device comprising a resilient gasket covering said plate surrounding said receptacle and a cover plate forming a surface substantially flush with the concrete floor when mounted tightly against said gasket and also having an access opening therein exposing said receptacle, said cover plate including an elongated cover hingedly mounted in said access opening and overlying said duplex receptacle, means for locking said cover in place to seal said opening and thereby enclose said opening, and said cover having a downwardly extending sealing rim which bites into the gasket when the cover is locked in place, said locking means comprising a tapered cylindrical disc rotatably mounted on the cover and having a segmental portion thereof removed, means in the upper surface of the cover for rotating said disc, and a shoulder in the cover plate adjacent the access opening for receiving said disc whereby upon rotation of said disc said cover is pulled into tight sealing engagement with the gasket so that said sealing rim bites into the gasket to provide a water tight seal around said receptacle.

4. A closure device for a floor outlet box for use in concrete floors and comprising a cylindrical rough-in housing, an annular member adjustably positioned in said housing and including an upstanding sleeve, and a plate sealingly fitted within said sleeve and mounting a duplex receptacle, said device comprising a resilient gasket covering said plate surrounding said receptacle, a cover plate forming a surface substantially flush with the concrete floor when mounted tightly against said gasket and also having an access opening therethrough exposing said receptacle, said cover plate including an elongated cover hingedly mounted in said access opening and overlying said duplex receptacle, said cover and said cover plate having corresponding inwardly tapered marginal surfaces, means for locking said cover in place to seal said opening and enclose said receptacle, and said cover having a downwardly extending sealing rim adjacent the marginal edge thereof, which rim bites into the gasket when the cover is locked in place, said locking means comprising a tapered cylindrical disc rotatably mounted on the cover and having a segmental portion thereof removed, means in the upper surface of the cover for rotating said disc, and a shoulder in the cover plate adjacent the access opening for receiving said disc whereby upon rotation of said disc said cover is pulled into tight sealing engagement with the gasket so that said sealing rim bites into the gasket to provide a water tight seal around said receptacle.

5. A closure device for a floor outlet box for use in concrete floors and comprising a cylindrical rough-in housing, an annular member positioned in said housing and including an upstanding sleeve, and a plate sealingly fitted within said sleeve and mounting a duplex receptacle, said device comprising a resilient gasket covering said plate surrounding said receptacle and a cover plate forming a surface substantially flush with the concrete floor when mounted tightly against and in sealing engagement with said gasket and also having an access opening therein exposing said receptacle, said cover plate including an elongated cover hingedly mounted in said access opening and overlying said duplex receptacle, and means for locking said cover in place to enclose said opening, the lower peripheral portion of said cover sealingly engaging said gasket when said cover is locked thereby providing a watertight seal.

References Cited in the file of this patent

UNITED STATES PATENTS

| | | |
|---|---|---|
| 488,198 | Hart | Dec. 20, 1892 |
| 943,958 | Wheeler | Dec. 21, 1909 |
| 1,236,754 | Patterson | Aug. 14, 1917 |
| 1,271,478 | Krantz | July 2, 1918 |
| 2,512,028 | MacMillan | June 20, 1950 |
| 2,715,212 | Swanson et al. | Aug. 9, 1955 |
| 2,886,630 | Gill | May 12, 1959 |

FOREIGN PATENTS

| | | |
|---|---|---|
| 498,208 | Canada | Dec. 8, 1953 |